United States Patent [19]

Vallery

[11] Patent Number: 5,355,836
[45] Date of Patent: Oct. 18, 1994

[54] DOG-FECES COLLECTION SYSTEM

[76] Inventor: Julius C. Vallery, 26010 Calmhill Dr., Torrance, Calif. 90505

[21] Appl. No.: 116,289

[22] Filed: Sep. 3, 1993

[51] Int. Cl.⁵ .......................................... A01K 23/00
[52] U.S. Cl. .................................................. 119/95
[58] Field of Search ................. 119/95, 143; 604/349, 604/395, 359, 391; 294/1.3

[56] References Cited

U.S. PATENT DOCUMENTS

| | | | |
|---|---|---|---|
| 2,190,115 | 2/1940 | Fuqua | 119/95 X |
| 3,090,356 | 5/1963 | Andrisani | 119/95 |
| 4,444,152 | 4/1984 | Berado | 119/95 |
| 4,709,661 | 12/1987 | Mayle, Jr. | 119/95 |
| 4,969,419 | 11/1990 | Fong | 119/95 |

FOREIGN PATENT DOCUMENTS

| | | | |
|---|---|---|---|
| 559568 | 7/1958 | Canada | 119/95 |
| 3104727 | 8/1982 | Fed. Rep. of Germany | 119/95 |

*Primary Examiner*—Thomas Price
*Attorney, Agent, or Firm*—W. Edward Johansen

[57] ABSTRACT

A dog-feces collection system includes a harness and a bag. The harness is attached to a dog adjacent to his rear-end. The bag has an open end, a first side edge and a second side edge and is detachably coupled to the harness. The harness holds open the bag in order to collect feces from the dog.

1 Claim, 2 Drawing Sheets

DOG-FECES COLLECTION SYSTEM

BACKGROUND OF THE INVENTION

The field of the invention is systems for collecting dog-feces.

U.S. Pat. No. 4,900,077 teaches a device which is storable in a pocket or purse, containing two extendable arms, attached to each other at one end, which spread apart when extended due to spring action. In this extended position the arm tips and apex, each having a nubble, are in triangular arrangement so that a disposable bag can be stretchably attached over the nubbles at these three points, thus covering the fork arms and protecting them from soiling. The bag is used as a receptacle for dog feces which is pushed into it with a small stick or other disposable material. After use the arms are pushed back into the handle of the device so that it can be discreetly stored.

U.S. Pat. No. 4,909,553 teaches a scoop component which includes two leaves extending opposite from each other and having adjacent ends joined by a folding and tear line, which folding and tear line is interrupted by an apertured cutout tab projecting from one of the leaves, which leaves have folding lines flaring from the folding and tear line adjacent to the tab toward the corners of the ends of the leaves opposite the folding and tear line, a bag receivable in folded condition between the leaves when they are folded into overlying registration about the folding and tear line, and an envelope for receiving the folded scoop component with the bag received between its leaves and having a slot through which the tab projects for hanging the kit.

U.S. Pat. No. 4,741,566 teaches an apparatus for removing animal feces which will conveniently collect and enclose feces into a receptacle. An improved scraping device opens outward of the receptacle in response to squeezing a trigger handle and which automatically in a scraping motion moves and encloses feces in the receptacle.

U.S. Pat. No. 4,741,565 teaches a portable and disposal litter collector for scooping up pet feces or other similar litter. The collector includes a hooded shovel. The shovel blade may be constructed with holes in its bottom to allow particles equal to or smaller than the hole size to escape. Connected to the shovel handle is a moisture impregnable flexible cover. The cover is draped back over the handle and the user's hand to avoid user contamination. After the litter is scooped up, the sleeve is draped back over the hooded shovel and drawn close so that the litter cannot fall out as it is taken to the nearest receptacle for disposal.

U.S. Pat. No. 4,819,977 teaches a dog feces retrieval and bagging device which allows use by persons of all ages without undue effort or bending. The retrieval, bagging, tying and containing of waste material in one operation has not heretofor been realised. The device consists of a hollow tube with eight flexible fingers on one end, a removable sleeve over the tube, and a lanyard and cap at the other end, and a plastic bag with rubber band. When the plastic bag is placed over the exposed fingers, the bag end folded back and fixed with a rubber band over the sleeve, the sleeve is then moved forward over the exposed and bagged fingers. Retracting the sleeve, thus exposing the bagged fingers, the device is placed over the waste material to be retrieved. By moving the sleeve forward the fingers are caused to draw in the waste material into the bag and into the tube. The rubber band slips over the fingers and ties the bag. The bag containing the waste material is held within the device out of view and is ejected by retracting the sleeve.

U.S. Pat. No. 4,383,710 teaches a pet litter retriever which is characterized by a simple, unique mechanical actuation system which effects the closing and opening of a pair of blades which a plastic bag envelopes and is held in place by a clip such that dog droppings and the like may be enveloped in the bag and retained in place over the blades while the bag is inverted around the droppings to completely enclose same without soiling the retriever.

U.S. Pat. No. 4,466,647 teaches a device for catching dog feces to prevent soiling of city streets and sidewalks including a telescoping wand having a pair of spring arms at the working end, which arms have clips thereon for releasably holding a conventional plastic bag.

SUMMARY OF INVENTION

The present invention is directed to a dog-feces collection system which includes a bag having an open end which is held open in order to collect feces from a dog.

In a first separate aspect of the invention the dog-feces collection system includes a harness which is attached to a dog adjacent to his rear-end. The harness is detachably coupled to the bag.

In a second separate aspect of the invention the the dog is wearing a collar. The harness includes a first stap, a second strap, a third strap and a fourth strap. The first strap has a first end and a second end. A first connector clip is coupled to the first end of the first strap. The first connector clip connects the first end of the first strap to the first side edge of the bag. The second strap has a first end and a second end. A second connector clip is coupled to the first end of the second strap. The second connector clip connects the first end of the second strap to the second side edge of the bag. The third strap has a first end and a second end. A third connector clip is coupled to the first end of the third strap and connects the first end of the third strap to the collar. The second ends of the first and second straps are coupled to the third strap adjacent to the first end thereof. The fourth strap has a first end, a middle point and a second end and is coupled at the middle point thereof to the third strap adjacent to the second end thereof. The fourth strap is wrapped once around the dog's body adjacent to his hind legs. The first and second ends of the fourth strap are detachably coupled together. The first and second straps adjacent to the first ends thereof are coupled to the fourth strap. A fourth connector clip and a fifth connector clip are coupled to the second end of the third strap. The fourth and fifth connector clips connect the second end of the third strap to the open end of the bag.

In a third separate aspect of the invention the harness is a strap having a first end and a second end and the bag has a hole adjacent to the open end thereof. The bag includes a flap, a first loop and a second loop. The flap is coupled to the bag above the hole and adjacent to the hole. The first and second loops are coupled to the bag adjacent to the first and second side edges, respectively, and above the open end thereof. The strap is threaded through the first and second loops. The first and second ends of the strap are detachably coupled together.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Figure 1:
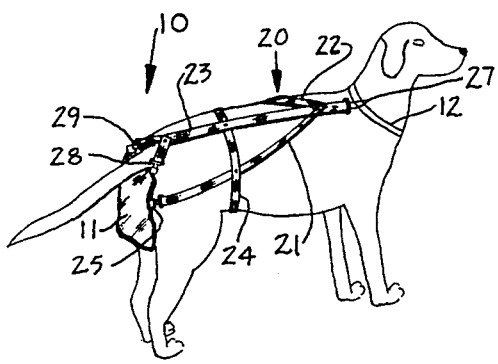
FIG. 1 is a schematic diagram of a dog wearing a dog-feces collection system according to a first embodiment of the present invention.

Referring to FIG. 1 a dog-feces collection system 10 includes a bag 11 which has an open end. The dog is wearing a collar 12. The dog-feces collection system 10 also includes a harness 20 which is attached to a dog adjacent to his rear-end. The harness 20 is detachably coupled to the bag 11.

Figure 2:
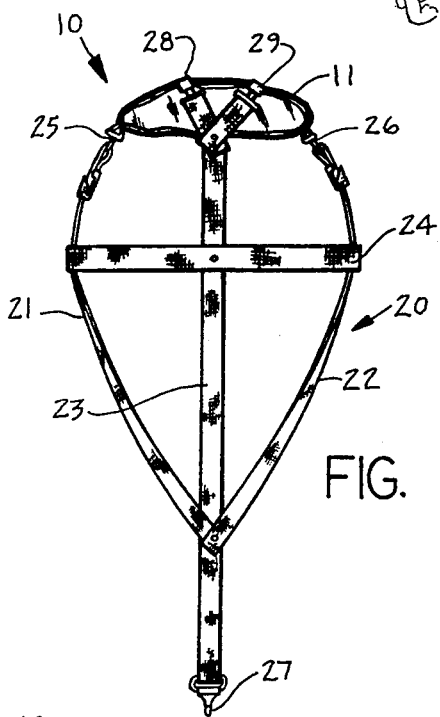
FIG. 2 is a top plan view of the dog-feces collection system of FIG. 1.
Figure 3:
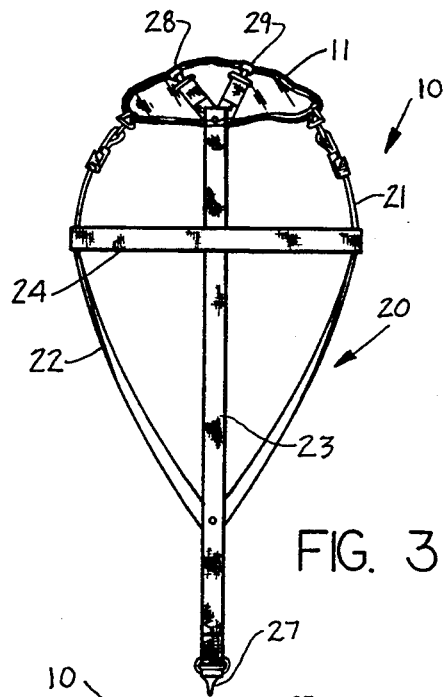
FIG. 3 is a bottom plan view of the dog-feces collection system of FIG. 1.

Referring to FIG. 1 in conjunction with FIG. 2 and FIG. 3 the harness 20 includes first stap 21, a second strap 22, a third strap 23 and a fourth strap 24. The first strap 21 has a first end and a second end. A first connector clip 25 is coupled to the first end of the first strap 21. The first connector clip 25 connects the first end of the first strap 21 to the first side edge of the bag 11. The second strap 22 has a first end and a second end. A second connector clip 26 is coupled to the first end of the second strap 22. The second connector clip 26 connects the first end of the second strap 22 to the second side edge of the bag 11.

Figure 4:
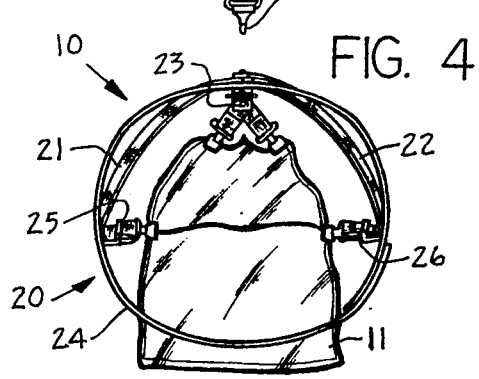
FIG. 4 is a front elevational view of the dog-feces collection system of FIG. 1.
Figure 6:
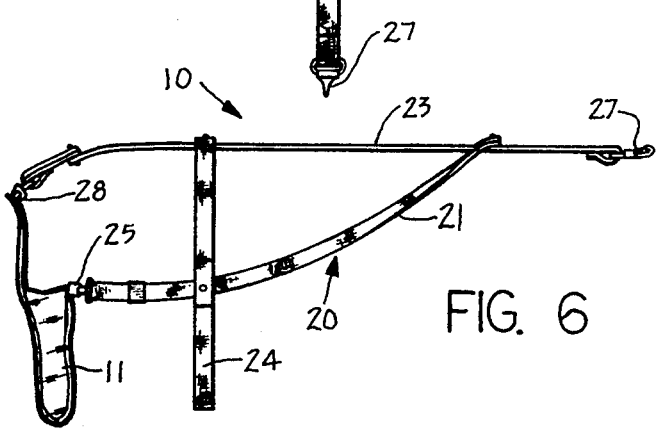
FIG. 6 is a side elevational view of the dog-feces collection system of FIG. 1.
Figure 5:
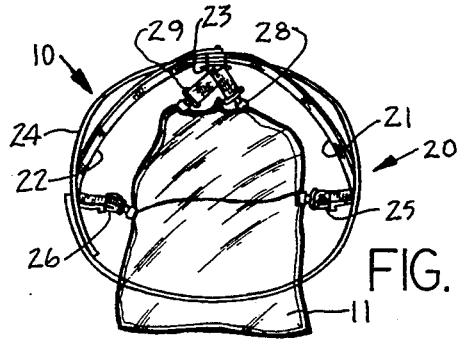
FIG. 5 is a rear elevational view of the dog-feces collection system of FIG. 1.

Referring to FIG. 1 in conjunction with FIG. 4, FIG. 5 and FIG. 6 the third strap 23 has a first end and a second end. A third connector clip 27 is coupled to the first end of the third strap 23 and connects the first end of the third strap 23 to the collar 12. The second ends of the first and second straps 21 and 22 are coupled to the third strap 23 adjacent to the first end thereof. The fourth strap 24 has a first end, a middle point and a second end and is coupled at the middle point thereof to the third strap 23 adjacent to the second end thereof.

Figure 7:
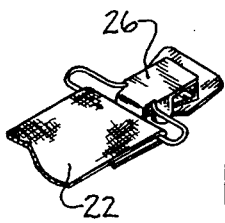
FIG. 7 is a perspective of a connector clip which is used in the dog-feces collection system of FIG. 1.

The fourth strap 24 is wrapped once around the dog's body adjacent to his hind legs. The first and second ends of the fourth strap 24 are detachably coupled together. The first and second straps 21 and 22 adjacent to the first ends thereof are coupled to the fourth strap 24. A fourth connector clip 28 and a fifth connector clip 29 are coupled to the second end of the third strap 23. The fourth and fifth connector clips 28 and 29 connect the second end of the third strap 23 to the open end of the bag 11. FIG. 7 shows the second connector clip 26.

Figure 9:
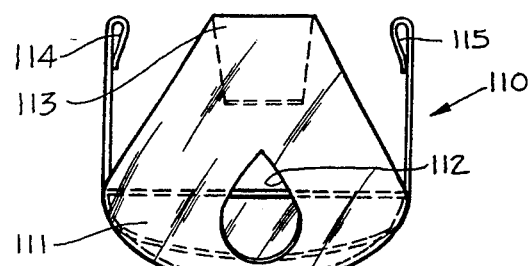
FIG. 9 is a top plan view of the dog-feces collection system of FIG. 8.
Figure 8:
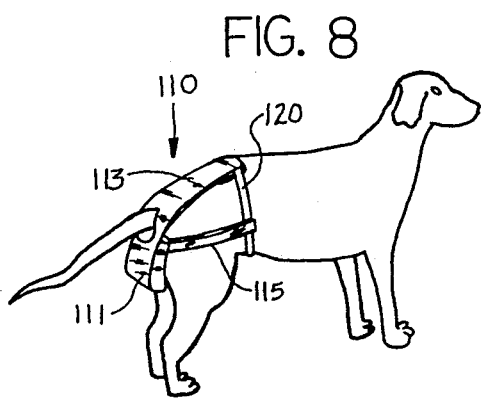
FIG. 8 is a schematic diagram of a dog wearing a dog-feces collection system according to a second embodiment of the present invention.
Figure 11:
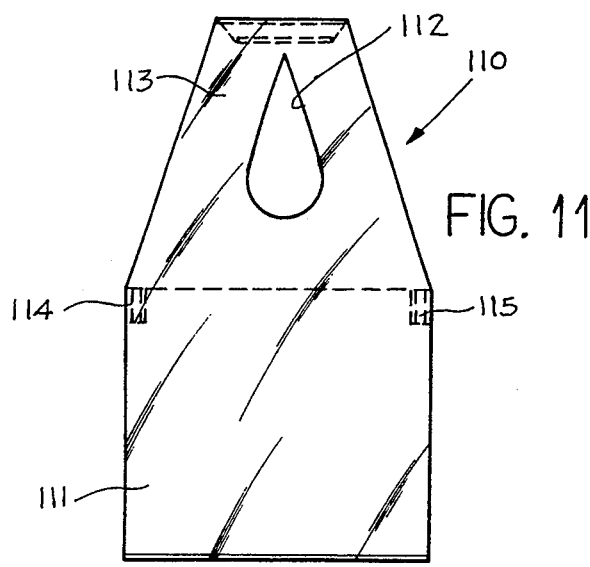
FIG. 11 is a rear elevational view of the dog-feces collection system of FIG. 8.
Figure 10:
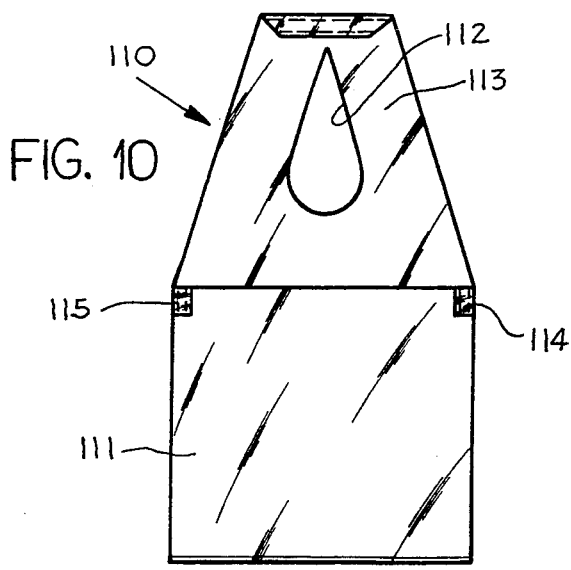
FIG. 10 is a front elevational view of the dog-feces collection system of FIG. 8.

Referring to FIG. 8 in conjunction with FIG. 9, FIG. 10 and FIG. 11 the dog-feces collection system 110 includes a bag 111 which has an open end. The dog is not wearing a collar. The dog-feces collection system 110 also includes a harness 120 which is attached to a dog adjacent to his rear-end. The harness 120 is a strap 121 which has a first end and a second end and is detachably coupled to the bag 111. The bag 111 has a hole 112 adjacent to the open end thereof. The bag 111 includes a flap 113, a first loop 114 and a second loop 115.

Figure 12:
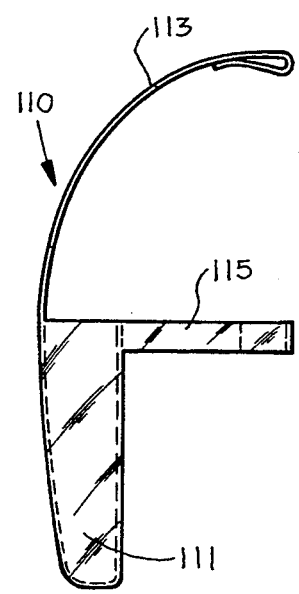
FIG. 12 is a side elevational view of the dog-feces collection system of FIG. 8.
Figure 13:
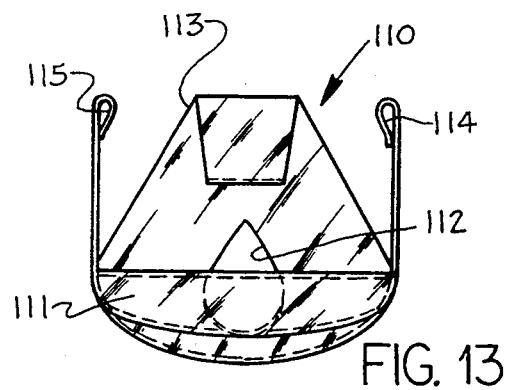
FIG. 13 is a bottom plan view of the dog-feces collection system of FIG. 8.

Referring to FIG. 8 in conjunction with FIG. 12 and FIG. 13 the flap 113 is coupled to the bag 111 above the hole 112 and adjacent to the hole 112. The first and second loops 114 and 115 are coupled to the bag 111 adjacent to the first and second side edges, respectively, and above the open end thereof. The strap 121 is threaded through the first and second loops 114 and 115. The first and second ends of the strap 121 are detachably coupled together.

From the foregoing it can be seen that a dog-feces collection system has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A dog-feces collection system comprising:
  a. a bag having an open end, a first side edge and a second side edge; and
  b. a harness attached to a dog adjacent to his rear-end, said harness including:
    i. a first strap having a first end and a second end;
    ii. a first connector clip coupled to said first end of said first strap whereby said first connector clip connects said first end of said first strap to said first side edge of said bag;
    iii. a second strap having a first end and a second end;
    iv. a second connector clip coupled to said first end of said second strap whereby said second connector clip connects said first end of said second strap to said second side edge of said bag;
    v. a third strap having a first end and a second end;
    vi. a third connector clip coupled to said first end of said third strap whereby said third connector clip connects said first end of said third strap to the collar and whereby said second ends of said first and second straps are coupled to said third strap adjacent to said first end thereof;
    vii. a fourth strap having a first end, a middle point and a second end, said fourth strap being coupled at said middle point thereof to said third strap adjacent to said second end thereof whereby said fourth strap is wrapped once around the dog's body adjacent to his hind legs, said first and second ends of said fourth strap are detachably coupled together and said first and second straps adjacent to said first ends thereof are coupled to said fourth strap; and viii. a fourth connector clip and a fifth connector clip coupled to said second end of said third strap whereby said fourth and fifth connector clips connect said second end of said third strap to said open end of said bag whereby said bag is detachably coupled to said harness so that said harness holds open said bag in order to collect feces from the dog.

* * * * *